Oct. 3, 1939. C. G. NAYLOR 2,174,668
HAND BRAKE
Filed July 13, 1936

Inventor:
Carl G. Naylor,
By Zabel, Carlson & Wells
Attorneys

Oct. 3, 1939.  C. G. NAYLOR  2,174,668
HAND BRAKE
Filed July 13, 1936  4 Sheets-Sheet 2
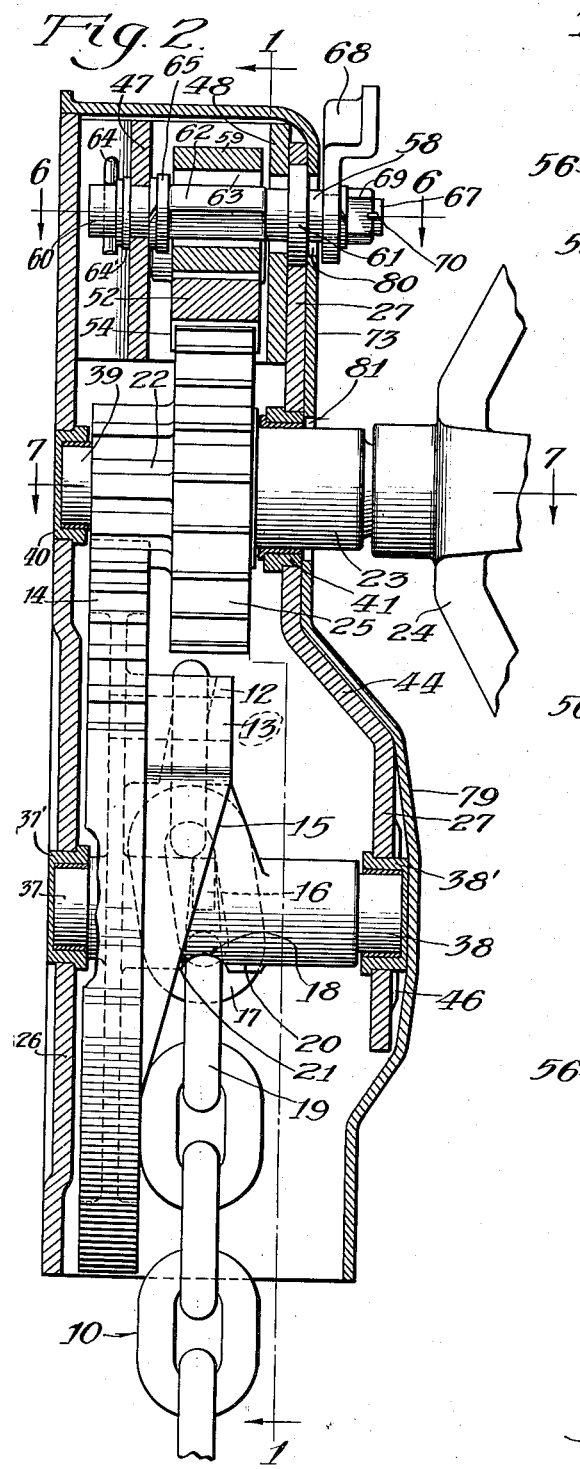
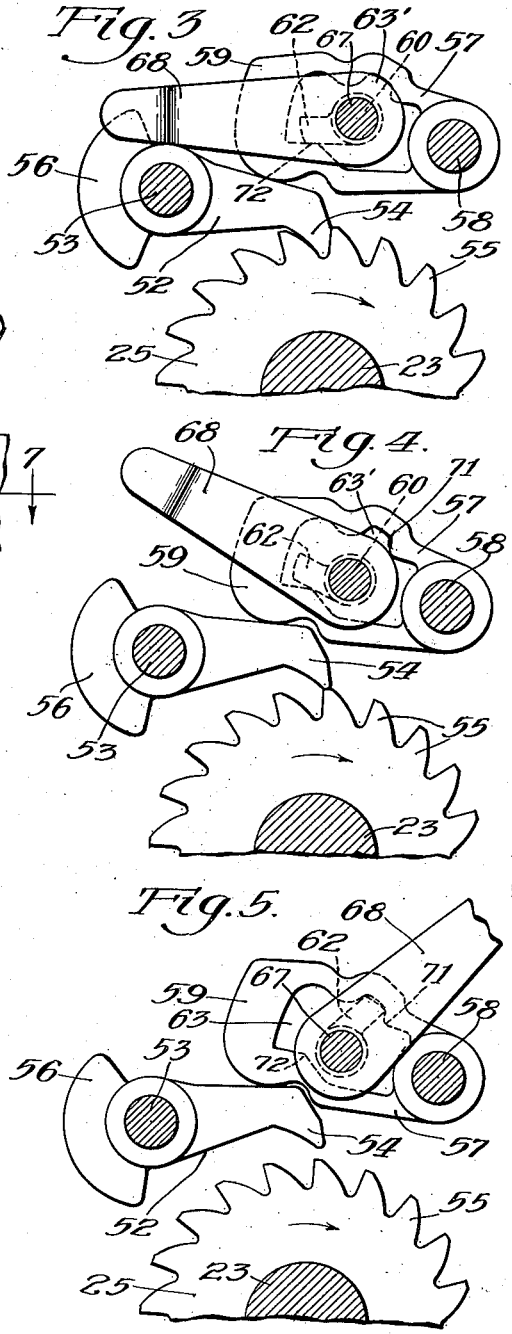
Inventor:
Carl G. Naylor,
By Zabel, Carlson & Wells,
Attorneys Oct. 3, 1939.   C. G. NAYLOR   2,174,668
HAND BRAKE
Filed July 13, 1936    4 Sheets-Sheet 3

Inventor:
Carl G. Naylor,
By: Zabel, Carlson & Wells,
Attorneys

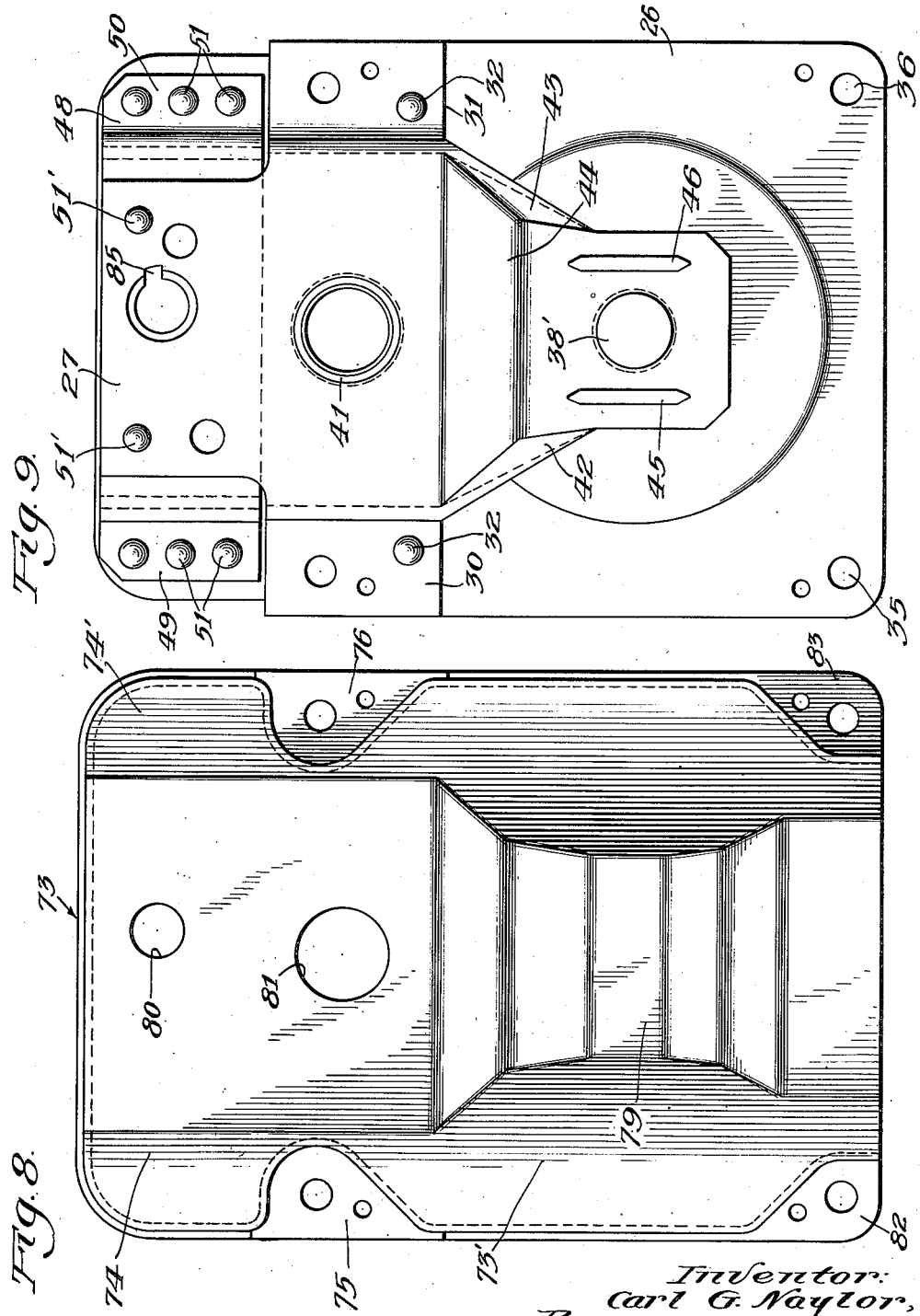

Patented Oct. 3, 1939

2,174,668

UNITED STATES PATENT OFFICE 2,174,668

HAND BRAKE

Carl G. Naylor, Chicago, Ill., assignor to Naylor Patents Corporation, Chicago, Ill., a corporation of Delaware Application July 13, 1936, Serial No. 90,368

18 Claims. (Cl. 74—505)

This invention relates to railway car hand brakes and particularly to the means for controlling the hand power mechanism by which the brakes are set and released.

In mechanisms of this character, there is usually provided a winding drum or sheave which connects to a chain or other flexible power transmitting member which is wound upon the sheave in applying the brakes of a car. The flexible member is connected by a suitable bell crank mechanism to the foundation brake system. The winding drum is operated by means of a suitable drive shaft which is usually provided with a hand wheel for rotating the same.

The present invention contemplates the provision in a brake operating mechanism of this character of a novel ratchet and pawl mechanism for locking the sheave against rotation when the load has been applied. This novel mechanism is desirably so arranged as to permit the operator to wind the brake chain upon the winding drum with perfect freedom, the pawl parts which operate to prevent reverse rotation to release the brakes being completely housed and offering no obstruction.

The features and advantages of the invention will more readily appear from the following description, reference being had to the accompanying drawings wherein a preferred form of the invention is shown.

In the drawings—

Fig. 2 is a sectional view taken on the line 2—2 of Fig. 1;

Fig. 3 is a fragmentary sectional view of the pawl mechanism shown in Fig. 2, Fig. 3 being taken substantially on the line 1—1 of Fig. 2, but the handle which controls the pawl mechanism left on to indicate its position during the operation of the pawl;

Fig. 4 is a view similar to Fig. 3 showing a changed position of the parts.

Fig. 5 is a view similar to Fig. 3 showing a further position of the parts;

Fig. 8 is a view in front elevation of the housing for the operating mechanism; and Fig. 9 is a view in front elevation of the frame for supporting the operating mechanism.

Figure 1:
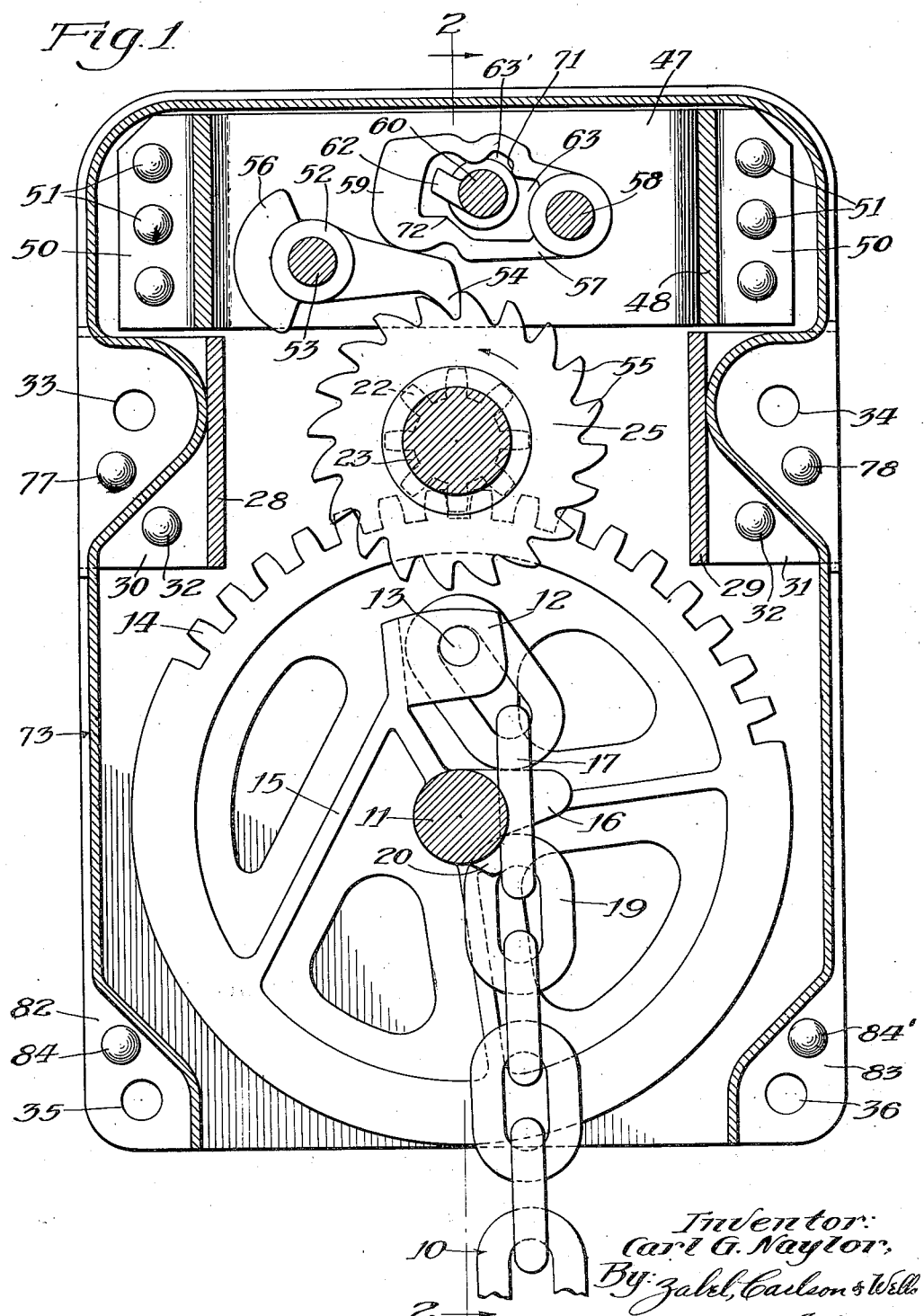
Fig. 1 is a vertical sectional view through a hand brake operating mechanism taken substantially on the line 1—1 of Fig. 2.

Referring now in detail to the drawings wherein a preferred embodiment of the invention is shown, the present invention is applied to a brake operating mechanism which is connected by means of a chain 10 through a bell crank device, not shown, to a foundation brake system for operating brakes upon a railway car. The chain 10 is adapted to be wound about a winding shaft 11 which is part of a winding drum comprising a casting having a lug at 12 to which chain 10 is secured by a pin 13. The casting is in the form of a gear wheel having gear teeth 14 in its periphery. On the casting there is provided a rib 15 which tapers from the lug 12, as shown best in Fig. 2, toward the gear wheel as it extends across the wheel to the periphery thereof. The function of this rib 15 is that of a guide to guide the chain 10 and to prevent its becoming wound upon itself as it is wrapped around the shaft 11.

The shaft 11 has a projecting finger 16 which is adapted to extend through the second link 17 of the chain 10 as the chain is being wound about the shaft 11. The shaft 11 is also grooved, as indicated at 18 (see Fig. 2), to receive a third link 19 of the chain 10 to thus bring the chain close to the axis of rotation of the shaft 11 and to give more power for any given size of gear wheel employed. The structure is such that a definite quick take up is provided until the second link of the chain lies flat against the shaft 11 and projections 20—21 hereinafter described. At this point, the maximum power is available to tighten the brake because the center line of link 17 is closest to the center line of shaft 11. At the sides of the recess 18, the shaft 11 is formed with pointed projections 20, 21 which act as reenforcements and as a bearing surface against which the link 17 may press. The winding shaft 11 is driven through the gear wheel part 14 by a pinion 22 on a drive shaft 23. The drive shaft 23 is adapted to receive a hand wheel 24 for rotating it. A ratchet wheel 25, which is desirably formed integral with the pinion 22, is also fixed to the shaft 23.

Figure 7:
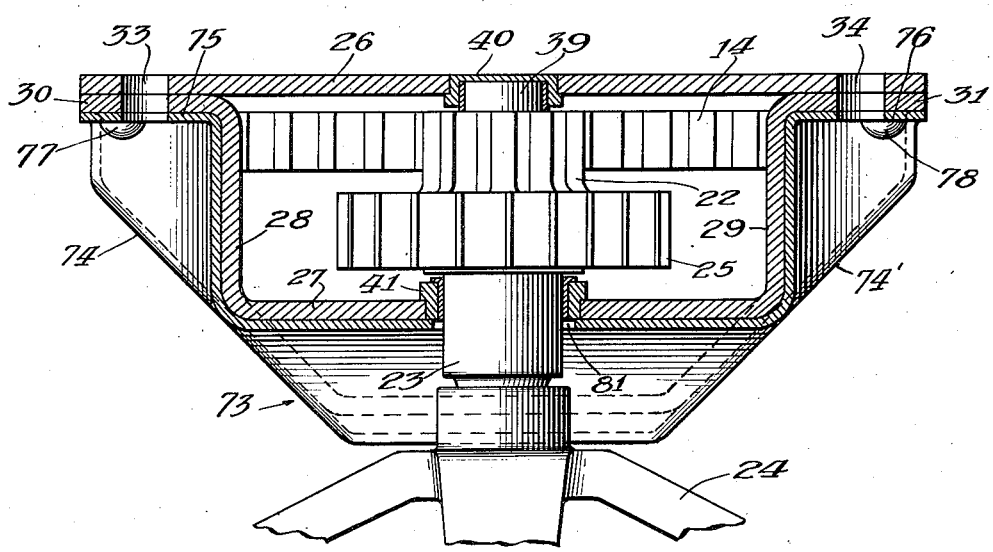
Fig. 7 is a plan sectional view on the line 7—7 of Fig. 2.

The mechanism is mounted in a framework which comprises a back plate 26 and a front plate 27 which is fixed to the back plate by side portions 28 and 29 (see Fig. 7) that are bent toward the back plate and provided with flattened outwardly projecting feet 30 and 31 secured to the back plate by rivets 32. Suitable holes 33 and 34 through the feet 30 and 31 and the back plate 26 provide for mounting the back plate 26 to the car body. Other holes 35 and 36 are provided at the lower end of the back plate 26 for mounting the plate on the car body. The shaft 11 has reduced end portions 37 and 38 (see Fig. 2) which are seated in suitable bearing cups 37' and 38' in the plates 26 and 27. In this fashion, the shaft 11 is secured in position with no exposed moving parts. The shaft 23 has a reduced end 39 seated in a bearing cup 40 in the back plate 26 and is journalled in a bearing sleeve 41 that is mounted in the front plate 27. From an inspection of Fig. 9, it will be seen that the front plate 27 is provided with webs at 42 and 43 to give additional strength to the lower end portion thereof which is offset forwardly at 44 from the upper portion. Suitable ribs 45 and 46 may also be used to strengthen the lower part which carries the bearing cup 38'.

The control mechanism whereby the ratchet wheel 25 is held against rotation in a direction to unwind the chain 10 from the shaft 11 is carried by a rear plate 47 and a front plate 48. These plates are formed, as shown best in Fig. 6, in substantially U-shape with outwardly extending foot portions 49 and 50, respectively, which portions are secured by suitable rivets 51 to the back plate 26. The upper end of the front plate 27 (see Fig. 9) is secured by rivets 51' to the front pawl plate 48. A counterweighted pawl 52 is carried by a shaft 53 which is rotatably journalled in the plates 47 and 48. The pawl 52 has a tooth 54 which is adapted to engage teeth 55 of the ratchet wheel 25. The teeth 54 and 55 are so shaped that pressure in the direction of the arrow in Fig. 1 tends to force the tooth 54 down between the teeth 55, while pressure in the opposite direction will lift the tooth 54 out of the way of the tooth 55.

The pawl 52 is counterweighted by a weighted part 56 cast integral therewith and disposed opposite the tooth 54. The weight of the part 56 is amply sufficient to raise the tooth 54 out of engagement with the ratchet wheel 25 and retain it there, as is clearly shown in Figure 5.

The normal position of the pawl 52, that is the position it would take due to the weighted part 56 if it were not restrained, would be a position where the tooth 54 would not engage the ratchet wheel 25. I provide means whereby the effect of the counterweight 56 can be controlled and made to cooperate with another weighted member to control the position of the pawl in a very satisfactory manner.

Between the plates 47 and 48, there is mounted a weighted arm 57. It is journalled on a shaft 58 that extends through the plates 27, 47, and 48 and abuts against the plate 26. This arm 57 has its free end 59 directly over the pawl 52 in such a position that its weight opposes the counterweight 56. The weight of the portion 59 is ample to overcome the counterweight 56 and to force the tooth 54 of the pawl 52 into engagement with the tooth 55 of the ratchet wheel 25.

Means are provided whereby to control the operation of the arm 57 in such a fashion that its weight can be applied to or released from the pawl 52 at the will of the operator. A shaft 60 is mounted at one end in the plate 47, and at its other end it is provided with a collar 61 that is journalled in the front plate 27. This shaft has a finger 62 at the side thereof which finger is seated in a peculiarly shaped opening 63 formed in the arm 57. The shaft 60 passes through this opening, and the opening is sufficiently large, as will be evident from Figs. 3 to 5, to permit the arm 57 to rise and fall with the pawl 52 without turning the shaft 60 if the shaft 60 is in approximately the position shown in Figs. 1 and 4.

The shaft 60 is secured in position by means of a cotter pin 64 at its back end. A collar 65 and a spring washer 66 are utilized to provide sufficient friction to hold the shaft 60 normally in any position to which it is adjusted. A plain washer 64' may be inserted between the plate 47 and the cotter pin 64. The spring washer 66 is compressed between the plate 47 and the collar 65 to produce the necessary friction. On its front end, the shaft 60 is provided with a reduced extension 67 which receives a hand lever 68, the hand lever 68 being keyed to the extension 67. The hand lever is clamped in place by a nut 69 threaded on the reduced extension 67 and locked in place by means of a cotter pin 70.

The arm 57 engages the pawl at a substantial distance from the pawl pivot on the shaft 53. It moves up and down with the pawl as the pawl ratchets over the teeth of the ratchet wheel in tightening the brakes. As will appear from the following description, none of this movement is communicated to the hand lever 68 after it is lifted when the arm 57 rises with the pawl 52 as the pawl rides over a tooth of the ratchet wheel for the first time. The arm 57 is limited in its upward movement by the shaft 60. This limits the upward movement of the pawl 52.

Therefore, it is impossible for the pawl 52 and the arm 57 to be thrown back far enough to take the weight of the arm 57 off the pawl 52 unless the hand lever is thrown over. The hand lever, however, cannot be thrown over by the arm 57 to the position where it holds the arm 57 in raised position. The hand lever 68, therefore, remains stationary while the arm 57 and the pawl 52 are moved up and down in riding over the teeth of the ratchet wheel.

Referring now to Figs. 1 and 3 to 5, the operation of the arm 57 will be more readily understood from the following description. The opening 63 includes a recess 63'. At the point 71, it provides a shoulder adapted to receive the finger 62 so as to hold the arm 57 in the raised position shown in Fig. 5 of the drawings. To position the arm 57 in this position, the hand lever 68 is moved to the position shown in Fig. 5. It will be understood that, if the tooth 54 of the pawl 52 is engaged in the ratchet wheel 25 under pressure, the lifting of the arm 57 will not release the pawl and, therefore, there is no danger to the operator of the brake in shoving the lever 68 over to the position shown in Fig. 5. In order to completely release the holding pawl, it is necessary for the brakeman to then turn the hand wheel in a clockwise direction enough to release the pressure upon the tooth 54 of the pawl. When this happens, the counterweight 56 will lift the pawl up into the position shown in Fig. 5 leaving the hand wheel 24 and the brake mechanism completely free from any retarding influence of the pawl.

When the brakes are to be applied, the brakeman swings the lever 68 in a counterclockwise direction to the position shown in Fig. 3. The lever 68 can be utilized to force the tooth 54 into engagement with the ratchet wheel 25 and between the teeth 55 thereof. This is because the finger 62 is resting upon a shoulder 72 provided in the opening 63.

Now, when the operator starts to rotate the ratchet wheel in a clockwise direction as shown by the arrow in Figs. 3, 4, and 5, the tooth 55 of the ratchet wheel lifts the pawl 52 upwardly in opposition to the weight of the part 59 of the arm 57. This moves the hand lever 68 in a clockwise direction to the position shown in Fig. 4 where the tooth 54 will clear the tooth 55. The spring pressure on the shaft 60 by the spring washer 66 will hold the hand lever 68 in this position while the brakes are being tightened so that if any difficulty is encountered after the brakes have been applied in getting the tooth 54 to drop into the ratchet wheel, the brakeman can apply force to the lever 68 for this purpose. Usually this is not necessary because the weighted part 59 of the arm 57 will be sufficient to press the pawl tooth 54 into position between teeth 55 of the ratchet wheel.

The entire operating mechanism is protected by a housing 73 which is shown in front elevation in Fig. 8. This housing may be drawn from sheet metal or cast. It is open at the bottom and is bevelled along the sides at 74 and 74'. Mounting flanges are provided at 75 and 76 and are secured in position by rivets such as 77 and 78. The housing 73 is bulged outwardly opposite to the end of the shaft 11 as indicated at 79. The shaft 11, however, does not have any connection with the bulged out part 79 which is completely closed over the end of this shaft. Enlarged openings at 80 and 81 are provided for the shafts 60 and 23, respectively. The housing 73 thus does not have any actual connection to the moving parts of the mechanism. At the lower open end of the housing, reduced side flanges 82 and 83 are provided and are secured by suitable rivets 84 and 84' to the back plate 26.

Figure 6:
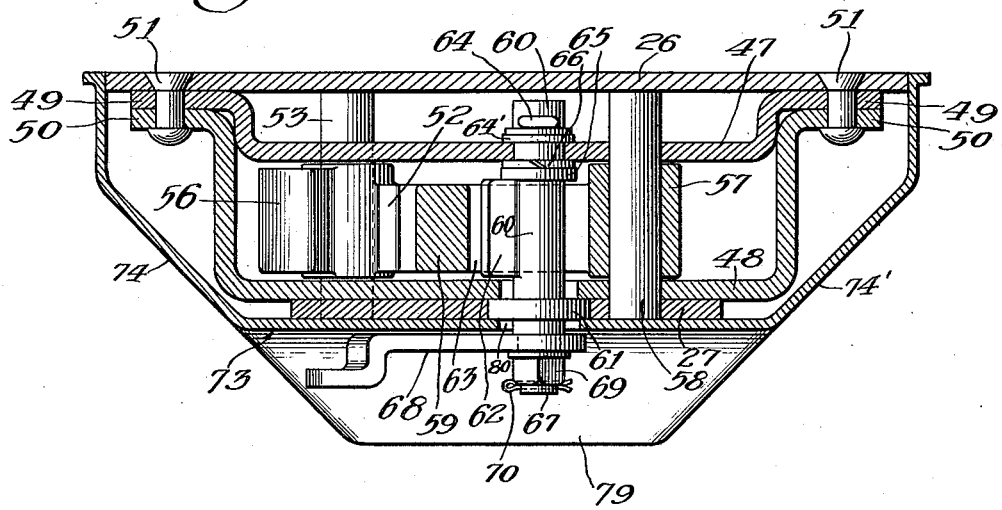
Fig. 6 is a plan sectional view on the line 6—6 of Fig. 2.

The entire housing 73 can be removed by removing the hand lever 68 and the hand wheel 24 and by removing the rivets such as 77, 78, 84, and 84'. The shaft 60 is adapted to be inserted through the plate 27 since the opening provided therein to receive the collar 61 is preferably made large enough in actual diameter so that the finger 62 will pass through it. The U-shaped plate 48 is provided with a slot at 85 (see Fig. 9) which is large enough to permit the finger 62 to be passed through it in the assembly. The shaft 58 can be threaded through from the front and will be held in place by the housing as illustrated in Fig. 6. Similarly, the shaft 53 is held in position by the housing 73 as will be readily understood.

With the housing 73 removed, it is evident that the pawl mechanism 52 and the arm 57 as well as the shaft 60 can be lifted out and replaced without disturbing the mounting of the front plate 27 or the pawl supporting plates 47 and 48.

While certain embodiments of the invention have been shown and described, it is to be understood that it is capable of many modifications.

It will be noted that the teeth 55 of the ratchet 25 are shaped in such manner that they co-operate with the tooth 54 of the pawl 52 to lock the pawl in engagement with the ratchet while the sheave is subjected to braking pressure. The sheave must be rotated slightly to relieve the braking pressure before the tooth 54 can be disengaged from the teeth 55.

Changes, therefore, in the construction and arrangement may be made without departing from the spirit and scope of the invention as disclosed in the appended claims in which it is the intention to claim all novelty inherent in the invention as broadly as possible in view of the prior art.

Having thus described the invention, what I claim as new and desire to secure by Letters Patent is:

1. In hand brake operating mechanism for railway cars, a sheave, a drive shaft therefor, a ratchet wheel on said shaft, a pawl adapted to engage the ratchet wheel to prevent rotation thereof in one direction, a weighted arm engaging said pawl to press the pawl into operative engagement with the ratchet wheel, said pawl having a counterweight thereon normally inoperative to overcome the weight of said arm and the pawl, and manually operable means having a loose connection with the arm, said manually operable means being engageable with the arm to press the arm against the pawl in one position thereof and to lift the arm away from the pawl in another position thereof sufficiently to permit the pawl to move away from the ratchet wheel.

2. A hand brake operating mechanism for railway cars comprising in combination a back plate, a front plate having portions offset with respect thereto and engaging the back plate to space the two plates apart, a winding sheave having a shaft journalled in said plates and having a gear secured thereto, a hand wheel shaft journalled in said plates and having a pinion meshing with said gear, said hand wheel shaft also having a ratchet wheel thereon, a pawl pivoted between said plates and adapted to engage said ratchet wheel, said pawl having a counterweight for moving it way from the ratchet wheel, and manually operable means for overcoming the counterweight of the pawl to place said pawl in engagement with the ratchet wheel at will, said manually operable means comprising a hand lever and spring tension means for maintaining said hand lever stationary in any adjusted position.

3. A hand brake operating mechanism for railway cars comprising in combination a back plate, a front plate having portions offset with respect thereto and engaging the back plate to space the two plates apart, a winding sheave having a shaft journalled in said plates and having a gear secured thereto, a hand wheel shaft journalled in said plates and having a pinion meshing with said gear, said hand wheel shaft also having a ratchet wheel thereon, a pawl pivoted between said plates and adapted to engage said ratchet wheel, said pawl having a counterweight for moving it away from the ratchet wheel, and manually operable means for overcoming the counterweight of the pawl to place said pawl in engagement with the ratchet wheel at will, said manually operable means comprising a weighted arm pressing on said pawl to overcome the counterweight, a hand lever, and means operable by said hand lever to lift the arm away from the pawl.

4. A hand brake operating mechanism for railway cars, comprising, a framework having a back plate and a front plate, a sheave journalled in said framework, a gear on said sheave, a handwheel shaft journalled in said frame-work, a pinion and a ratchet wheel on said shaft, said pinion being meshed with said gear, a pawl pivoted in said framework, a counterweight on said pawl for holding it away from said ratchet wheel, means to force the pawl against the ratchet wheel, and a housing for said framework having a bevelled front wall, side portions fixed to said framework, and a top wall extending over said framework.

5. In a device of the character described, a framework and housing for the operating mechanism for a hand brake, comprising front and back plates having bearings therein to support a winding sheave and a hand wheel shaft, and a housing for said plates having top and side portions extending to the back plate, said housing having a front wall bevelled from the side portions toward the center thereof, and said front plate also having bevelled side portions for a part of its length positioned parallel with the bevelled side portions of the housing so as to brace and reinforce the structure.

6. In a vertical hand brake operating mechanism for railway cars comprising a sheave having means to secure a chain thereto, and means for rotating said sheave, a ratchet wheel driven by said means, a pawl for holding said ratchet wheel against rotation in one direction, a counterweight on said pawl adapted normally to lift it from said ratchet wheel, a weighted arm opposing said counterweight to press the pawl toward the ratchet wheel, and movable means serving in one position as a stop for preventing overthrow movement of said arm out of operative position while permitting the arm to rise and fall with the pawl and serving in a changed position to hold the arm completely out of operative position with respect to said pawl.

7. A hand brake operating mechanism for railway cars, comprising, a framework having a back plate and a front plate, a sheave journalled in said framework, a gear on said sheave, a handwheel shaft journalled in said framework, a pinion and a ratchet wheel on said shaft, said pinion being meshed with said gear, a pawl pivoted in said framework, a counterweight on said pawl for holding it away from said ratchet wheel, and means to force the pawl against the ratchet wheel, a shaft for the pawl slidable endwise through the pawl and the front plate, and a housing for said framework covering the end of said shaft.

8. In hand brake operating mechanism for railway cars, a sheave, a drive shaft therefor, a ratchet wheel on said shaft, a pawl adapted to engage the ratchet wheel to prevent rotation thereof in one direction, a weighted arm engaging said pawl to press the pawl into operative engagement with the ratchet wheel, said pawl having a counterweight thereon normally inoperative to overcome the weight of said arm and the pawl, and manually operable means having a loose connection with the arm, said manually operable means comprising a hand lever, and means to hold said lever stationary in opposition to the force of gravity in any operative position thereof.

9. In a vertical hand brake operating mechanism for railway cars, comprising a sheave having means to secure a chain thereto, and means for rotating said sheave, a ratchet wheel driven by said means, a pawl for holding said ratchet wheel against rotation in one direction, a counterweight for lifting said pawl from the ratchet wheel, a weighted arm adapted to press the pawl into engagement with the ratchet wheel, a housing for said mechanism enclosing the pawl and the arm, and a hand lever outside said housing operatively connected to the arm to lift the arm from the pawl.

10. In a hand brake for railway cars, a winding sheave, means holding said sheave against unwinding, said means comprising a ratchet, a pivoted pawl engaging said ratchet, a pivoted weighted arm for urging said pawl into holding position, and means comprising a hand lever adapted to be held by friction in any adjusted position and adapted in one position to hold said pivoted arm completely out of effective engagement with said pawl.

11. In a hand brake for railway cars, a winding sheave, means holding said sheave against unwinding, said means comprising a ratchet, a pivoted pawl engaging said ratchet, a pivoted weighted arm for urging said pawl into holding position, a hand lever for displacing said weighted arm, and means associated with said hand lever for locking said weighted arm in a functionally inoperative position.

12. In a hand brake for railway cars, a winding sheave, means holding said sheave against unwinding, said means comprising a ratchet, a pivoted pawl engaging said ratchet, a pivoted weighted arm for urging said pawl into holding position, a hand lever for displacing said weighted arm, and means associated with said hand lever for locking said weighted arm in a functionally inoperative position, said weighted arm being movable relative to said hand lever when said weighted arm is in its functionally operative position.

13. A hand brake operating mechanism for railway cars comprising, a framework having a back plate and a front plate, a sheave journalled in said framework, a gear on said sheave, a hand wheel shaft journalled in said framework, a pinion and a ratchet wheel on said shaft, said pinion being meshed with said gear, a pawl pivoted in said framework, a counterweight on said pawl for holding it normally away from said ratchet wheel, a weighted arm for moving said pawl into engagement with said ratchet wheel, means comprising a lever adapted in one position to hold said pawl releasably in operative engagement with said ratchet wheel and adapted to yield upwardly for permitting a tooth of the ratchet wheel to raise the pawl and the lever so as to slide under the pawl upon rotation of the ratchet wheel in the direction for tightening the brake, and frictionally acting means adapted normally to prevent said lever from again moving downwardly after a ratchet wheel tooth has passed the pawl.

14. A vertical hand brake operating mechanism for railway cars comprising a sheave having means to secure a chain thereto, means for rotating said sheave, a ratchet wheel driven by said means, a pawl for holding said ratchet wheel against rotation in one direction, a weighted arm for moving said pawl into engagement with said ratchet wheel, means including a hand lever for controlling said weighted arm, and friction means for holding said hand lever in the adjusted position to which it is moved.

15. In a vertical hand brake operating mechanism for railway cars comprising a sheave having means to secure a chain thereto, and means for rotating said sheave, a ratchet wheel driven by said means, a pawl for holding said ratchet wheel against rotation in one direction, a counterweight on said pawl to lift it from said ratchet wheel, a weighted arm opposing said counterweight to press the pawl toward the ratchet wheel, and lever means having a loose connection with said arm to lift it from said pawl.

16. In a vertical hand brake operating mechanism for railway cars comprising a sheave having means to secure a chain thereto, and means for rotating said sheave, a ratchet wheel driven by said means, a pawl for holding said ratchet wheel against rotation in one direction, a counterweight on said pawl to lift it from said ratchet wheel, a weighted arm adapted to press upon the pawl and overcome the counterweight of said pawl, a hand lever movable with respect to said arm, means connecting the hand lever with said weighted arm whereby movement of said hand lever in one direction lifts said weighted arm completely out of effective engagement with the pawl, said hand lever being movable in the opposite direction to exert force through said weighted arm upon the pawl in opposition to its counterweight whereby to force the pawl into engagement with the ratchet wheel, and means for holding said lever by friction in adjusted position.

17. In a hand brake for railway cars, a winding sheave, means holding said sheave against unwinding, said means comprising a ratchet, a pivoted pawl engaging said ratchet, a pivoted weighted arm for urging said pawl into holding position, a hand lever for displacing said weighted arm, means associated with said hand lever for locking said weighted arm in a functionally inoperative position, and means for holding said hand lever frictionally in the position to which it is manually adjusted.

18. In a hand brake for railway cars, a winding sheave, means holding said sheave against unwinding, said means comprising a ratchet, a pivoted pawl engaging said ratchet, a pivoted weighted arm for urging said pawl into holding position, a hand lever for displacing said weighted arm, means associated with said hand lever for locking said weighted arm in a functionally inoperative position, and a spring washer associated with said hand lever adapted by frictional engagement with the lever to hold it yieldingly in any position to which it is manually adjusted.

CARL G. NAYLOR.